(12) United States Patent
Anastacio

(10) Patent No.: US 6,360,476 B1
(45) Date of Patent: Mar. 26, 2002

(54) AUDIBLE FISHING LURE

(76) Inventor: Nelson Anastacio, 1539 Dundas Street West, Toronto, Ontario (CA), M6K 1T6

( * ) Notice: Subject to any disclaimer, the term of this patent is extended or adjusted under 35 U.S.C. 154(b) by 0 days.

(21) Appl. No.: 09/551,848

(22) Filed: Apr. 18, 2000

Related U.S. Application Data

(63) Continuation-in-part of application No. 29/118,814, filed on Feb. 16, 2000.

(51) Int. Cl.⁷ .............................................. A01K 85/00
(52) U.S. Cl. ..................................................... 43/42.31
(58) Field of Search ............................ 43/42.31, 42.19, 43/42.2, 42.21

(56) References Cited

U.S. PATENT DOCUMENTS

| | | |
|---|---|---|
| 1,451,436 A | 4/1923 | Barnia |
| 2,541,397 A | 2/1951 | Wisener et al. |
| 2,545,398 A | 3/1951 | Warobiew |
| 2,626,478 A | 1/1953 | Folmer |
| 2,822,638 A | 2/1958 | Warterfield, Jr. |
| 2,833,078 A | 5/1958 | Peltz |
| 2,853,826 A | 9/1958 | Romeo |
| 2,881,548 A | 4/1959 | Backe |
| 2,977,705 A | 4/1961 | Busnel |
| 2,977,708 A | 4/1961 | Mills |
| 2,999,329 A | 9/1961 | Pankuch |
| 3,000,130 A | 9/1961 | Pankuch |
| 3,071,884 A * | 1/1963 | Peltz .......................... 43/42.31 |
| 3,104,486 A * | 9/1963 | Gressard ..................... 43/42.31 |
| 3,112,576 A * | 12/1963 | Tay ............................. 43/42.31 |
| 3,296,733 A | 1/1967 | McLean |
| 3,397,478 A * | 8/1968 | Lowes, Jr. .................. 43/42.31 |
| 3,449,852 A | 6/1969 | Mitchell |
| 3,494,063 A * | 2/1970 | Treaster ...................... 43/42.31 |
| 3,530,612 A * | 9/1970 | Gurka ......................... 43/42.31 |
| 4,163,338 A * | 8/1979 | Lucarini ...................... 43/42.17 |
| 4,823,497 A | 4/1989 | Pierce |
| 5,201,784 A * | 4/1993 | McWilliams ............... 42/42.31 |
| 5,497,581 A | 3/1996 | Williams |

OTHER PUBLICATIONS

Blue Fox Merchandise Catalog, 1999, p. 12.

* cited by examiner

Primary Examiner—Kurt Rowan
(74) Attorney, Agent, or Firm—Ridout + Maybee LLP; Dolly Kao

(57) ABSTRACT

An audible subsurface fishing lure, for travelling below the surface of a body of water when the lure is retrieved. The lure includes a subsurface lure body having a front, a rear, and a longitudinal axis extending between the front and the rear. A spinner is rotatably coupled to the lure body and rotatable about a first axis generally parallel to the longitudinal axis. Furthermore, a contact member is pivotally coupled to the lure body and engageable with the spinner when the spinner is rotating to produce sound for attracting fish.

10 Claims, 6 Drawing Sheets

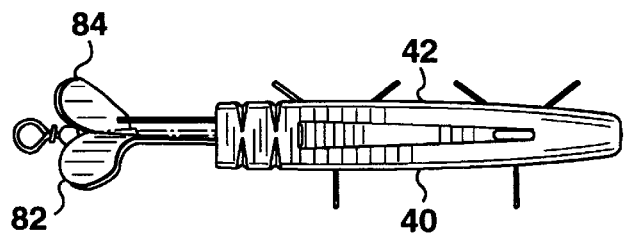
FIG. 3
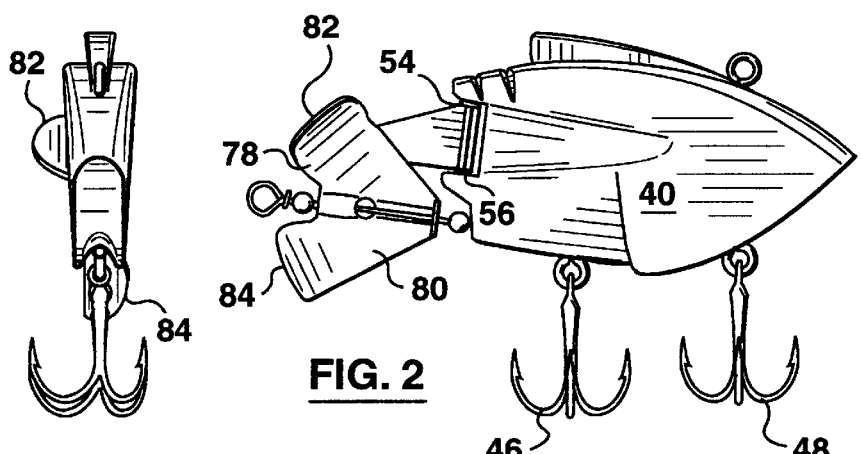
FIG. 2
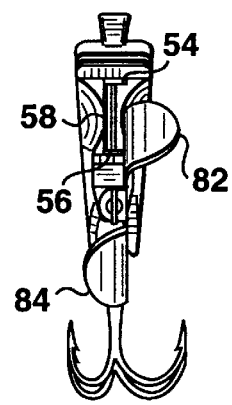
FIG. 5   FIG. 6
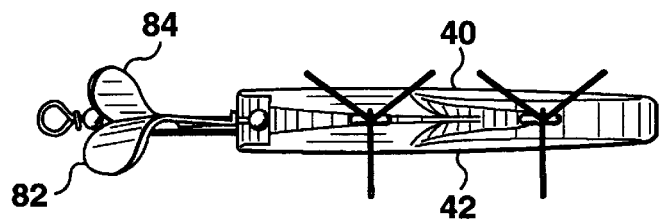
FIG. 4

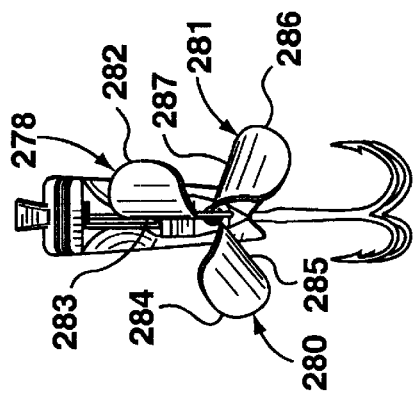
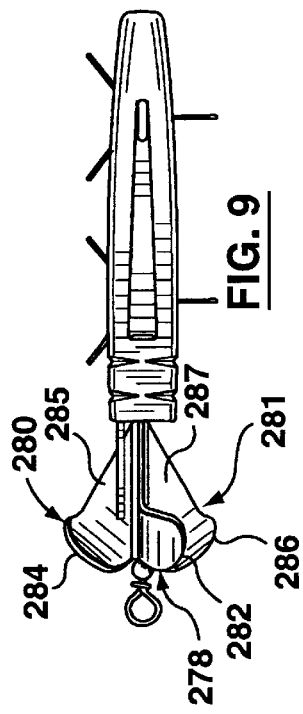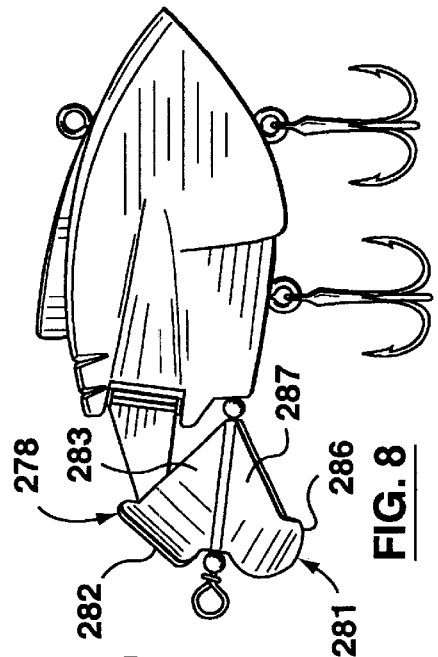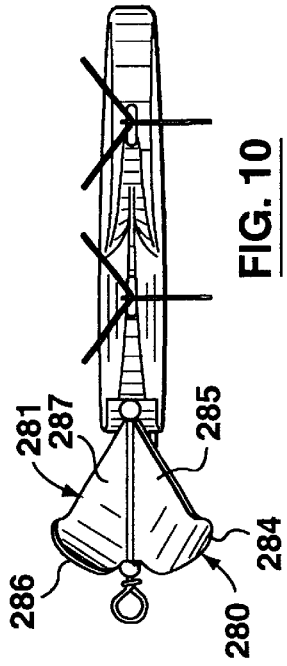
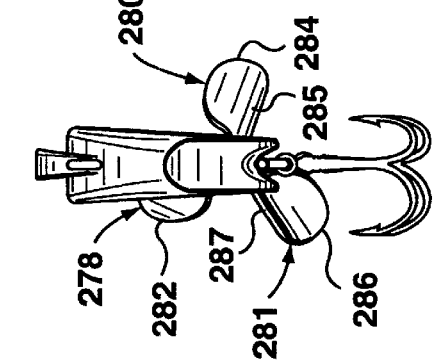

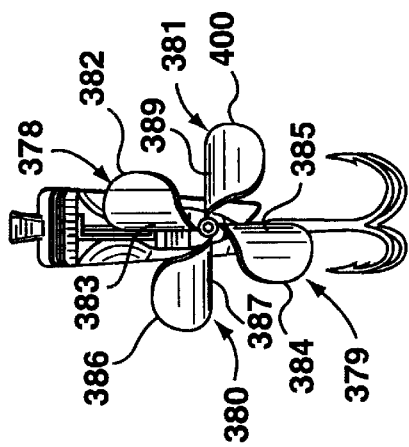
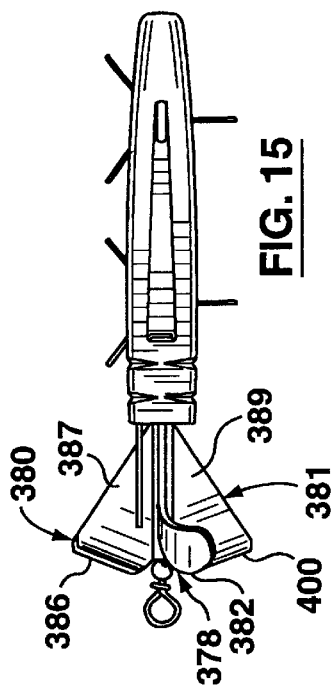
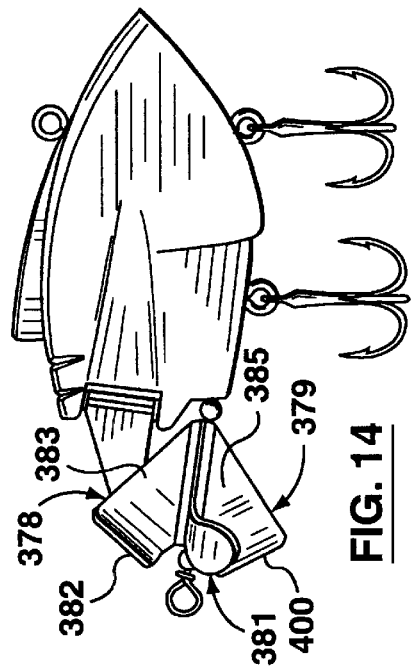
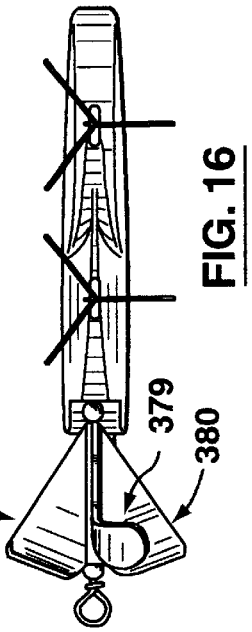
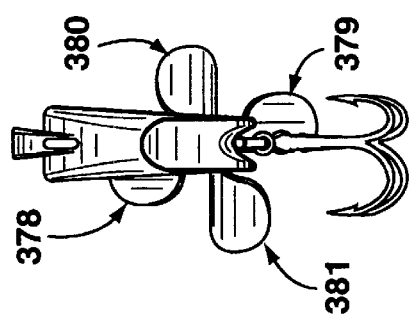

AUDIBLE FISHING LURE

This application is a continuation-in-part of U.S. Design patent application Ser. No. 29/118,814 filed Feb. 16, 2000.

FIELD OF THE INVENTION

The present invention relates to fishing lures and, more particularly, to subsurface fishing lures which are designed to travel below the surface of a body of water when being retrieved. Even more particularly, the invention relates to subsurface fishing lures adapted to, among other things, create sound for attracting fish.

BACKGROUND OF THE INVENTION

Fishing lures come in variety of forms, shapes, and colors, and can be designed to attract certain types of fish. Lures are commonly made to resemble live bait and have at least one sharp hook for hooking fish. In use, lures are connected to one end of a fishing line having an opposite end connected to a reel of a fishing rod. The line may be wound or unwound from the reel in order to retrieve or cast the lure, respectively, as desired.

There are two broad categories of fishing lures. A first category includes surface lures which travel along the surface of water when being retrieved. They are often designed to resemble bait or prey which dwell on the water's surface and are used to catch surface feeding fish such as large mouth bass, pike and muskie.

An obvious problem with surface lures is that they are not particularly effective in attracting fish which feed at lower levels.

The present invention relates to a second category of lures known as subsurface lures. These are lures which travel below the surface of the water when being retrieved. Subsurface lures include sinking lures and diving lures. Sinking lures automatically sink below the surface of the water when at rest. Diving lures float on the water when at rest, but dive below the surface when being reeled in. This is due to their particular shape, weight distribution, and location of attachment to a fishing line, as determined with reference to the body of the lure.

It is commonly believed that fish are attracted to sound, light and motion, and numerous fishing lures have been designed in the past to create such stimuli in the water. Examples of noise creating or audible fishing lures include those shown in U.S. Pat. Nos. 2,833,078; 2,853,826; 2,881,548; 2,999,329; 2,977,705; 3,296,733; 3,000,130; 3,449,852 and 5,497,581. In view of the popularity of sport fishing for many outdoor enthusiasts, there is an ever present need to provide new audible subsurface fishing lures. Accordingly, an object of the invention is to meet this need.

SUMMARY OF THE INVENTION

The invention provides an audible subsurface fishing lure for travelling below the surface of a body of water when the lure is retrieved. The lure includes a subsurface lure body having a front, a rear, and a longitudinal axis extending between the front and the rear. A spinner is rotatably coupled to the lure body and rotatable about a first axis generally parallel to the longitudinal axis. Furthermore, a contact member is pivotally coupled to the lure body and engageable with the spinner, when the spinner is rotating, to produce sound for attracting fish.

BRIEF DESCRIPTION OF THE DRAWINGS

The invention will be better understood with reference to the drawings in which:

FIG. 2 is a side view of the fishing lure;

FIG. 3 is a top view of the fishing lure;

FIG. 4 is a bottom view of the fishing lure;

FIG. 5 is a front view of the fishing lure;

FIG. 6 is a rear view of the fishing lure;

FIG. 8 is a side view of the fishing lure of FIG. 7;

FIG. 9 is a top view of the fishing lure of FIG. 7;

FIG. 10 is a bottom view of the fishing lure of FIG. 7;

FIG. 11 is a front view of the fishing lure of FIG. 7;

FIG. 12 is a rear view of the fishing lure of FIG. 7;

FIG. 14 is a side view of the fishing lure of FIG. 13;

FIG. 15 is a top view of the fishing lure of FIG. 13;

FIG. 16 is a bottom view of the fishing lure of FIG. 13;

FIG. 17 is a front view of the fishing lure of FIG. 13; and

FIG. 18 is a rear view of the fishing lure of FIG. 13.

DETAILED DESCRIPTION OF THE PREFERRED EMBODIMENT

Figure 1:
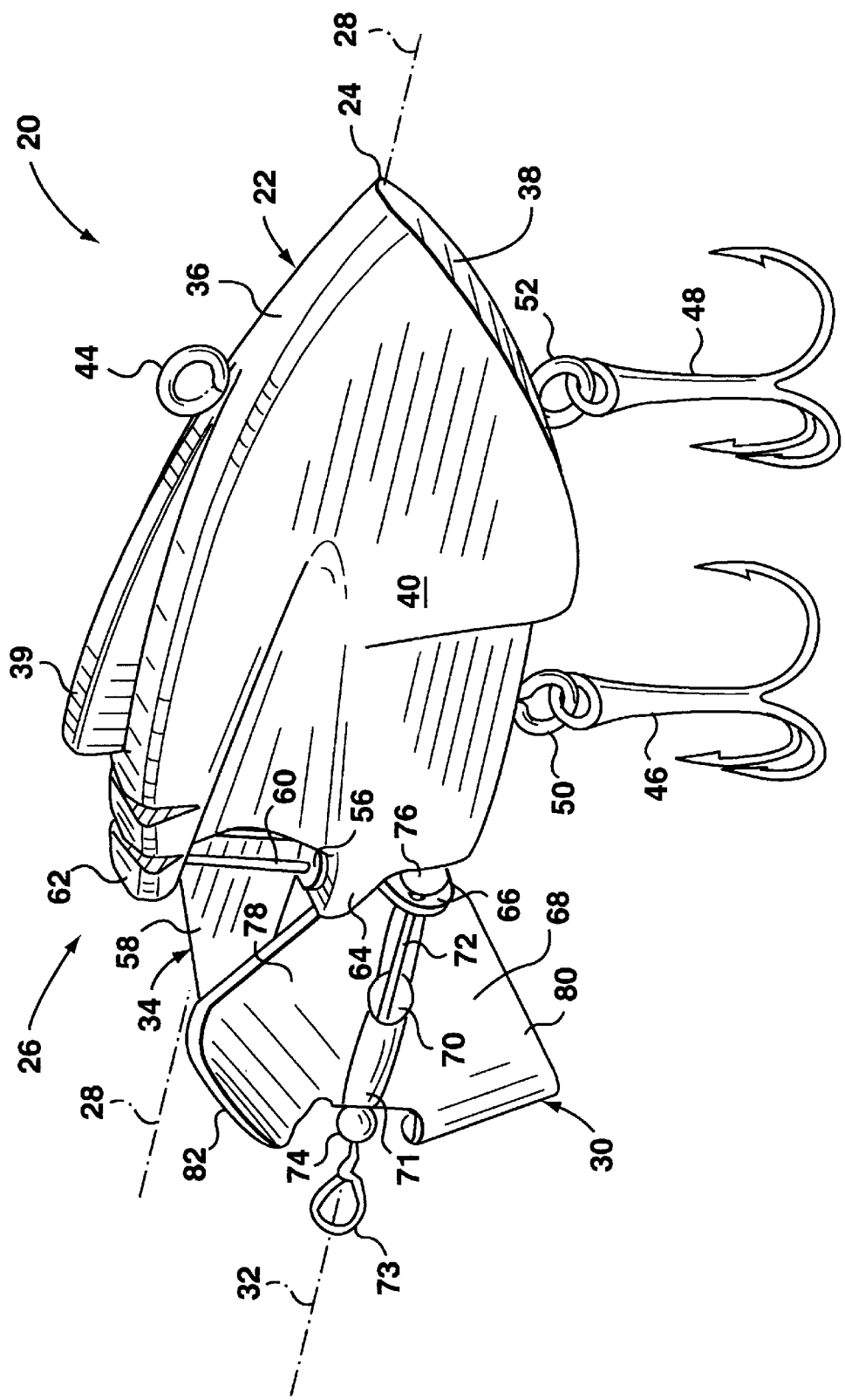
FIG. 1 is a perspective view of the fishing lure according to a first preferred embodiment of the invention having a two blade spinner.

Referring to FIGS. 1 to 6, an audible subsurface fishing lure designated generally by reference numeral 20 and according to the first preferred embodiment of the invention is shown. The fishing lure 20 is designed for travelling below the surface of a body of water when the lure 20 is retrieved, as will be described further below. The lure 20 includes a subsurface lure body 22 having a tapered nose 24 at a front thereof, a generally squared rear 26, and a longitudinal axis 28 (shown in chain-dotted outline) extending between the nose 24 and the rear 26. A spinner designated generally by reference numeral 30 made of stamped metal is rotatably coupled to the lure body 22 and rotatable about a first axis 32 (shown in chain-dotted outline) generally parallel to the longitudinal axis 28. A triangular contact member 34 also made of stamped metal is pivotally coupled to the lure body 22 and engageable with the spinner 30, when the spinner 30 is rotating, to produce sound for attracting fish.

As mentioned, the fishing lure 20 is designed for travelling below the surface of a body of water when the lure 20 is retrieved. In this embodiment, this is achieved by providing the lure 20 with a lure body 22 made of moulded plastic or any other suitable material and having an internal cavity (not shown) housing lead pellets for increasing the average density of the lure 20 and for creating a rattling sound as the lure 20 vibrates through the water when it is retrieved. Therefore, the lure 20 will be naturally positioned below the surface of the water when cast and will travel below the surface of the water when being retrieved.

The lure body 22 has top and bottom surfaces 36, 38 meeting at the nose 24 to render the lure body both attractive and streamlined in shape. The attractiveness of the lure 20 is enhanced by a tapered upper projection 39 extending from the top surface 36, and the inwardly tapering or grooving of the spaced, opposing, side surfaces 40, 42 which meet the top surface 26 at rounded corners and the bottom surface 38 at squared corners, as shown.

A connecting eyelet 44 is secured to the top surface 36 in a known manner and is used to connect the lure 20 to an end of a fishing line. The lure 20 further includes sharp hooks 46, 48 for hooking target fish biting the lure. The hooks 46, 48 are connected to respective attachment rings 50, 52 attached to the bottom surface 38 of the lure body 22.

The contact member 34 includes a pair of apertured extensions 54, 56 bent at right angles to a main triangular portion 58 of the contact member 34. These extensions 54, 56 are used to pivotally retain the contact member 34 on a contact pin 60 having opposite ends embedded in a pair of spaced rearward extensions 62, 64 of the lure body 22.

The spinner 30 includes an apertured forward extension 66 bent at a right angle to a main portion 68 of the spinner 30 which extends generally in a plane. A second aperture 70 of the spinner 30 communicates with a half-cylindrical passage 71 defined by a groove extending longitudinally and centrally along the main portion 68. A forward half of the passage 71 extends along one side of the main portion 68 and a rearward half of the passage 71 extends along the other side of the main portion 68. Extending through the passage 71, aperture 70, and apertured forward extension 66 is a spinner pin 72 having a forward end embedded in the rear 26 adjacent to the projection 64. The spinner 30 is rotatably retained on the spinner pin 72 between two beads 74, 76 threaded on the spinner pin 72 on either side of the spinner 30. A looped end 73 of the spinner pin 72 functions to retain the beads 74, 76 and spinner 30 on the spinner pin 72. As shown, the contact pin 60 and spinner pin 72 extend generally transversely to each other.

The spinner 30 is shaped to maximize the turning force when the lure 20 is pulled through the water. It is tapered forwardly and includes two radially-extending blades 78, 80 equidistantly angularly spaced from each other. Each blade 78, 80 includes a main portion extending generally in the plane of the main portion 68, and a rearward, radially-outward portion 82, 84 bent out of the plane in opposite directions to either side of the main portion 68.

In use, the lure 20 is cast and then retrieved through the water. While being retrieved, water flows past the spinner 30 thereby causing it to spin. While spinning, the blades 78, 80 come into contact with the contact member 34 to create sound attractive to fish. Furthermore, the contact member 34 moves from side to side to resemble the natural motion of a moving tail fm. As already mentioned, additional sound is created by the rattling of the lead pellets within the lure body 22.

Figure 7:
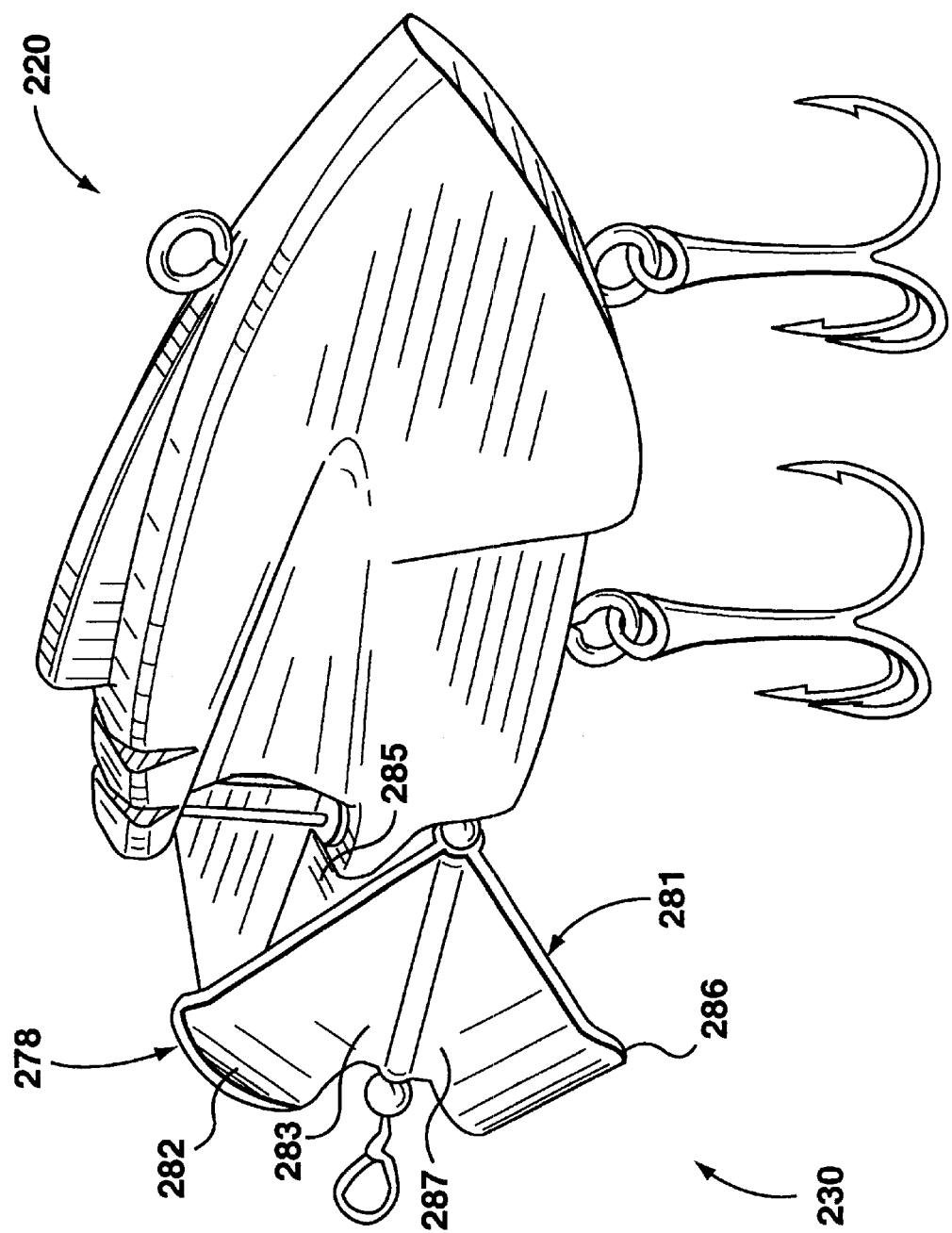
FIG. 7 is a perspective view of a fishing lure according to a second preferred embodiment of the invention having a three blade spinner.

Referring to FIGS. 7 to 12, a fishing lure 220 according to a second preferred embodiment of the invention is shown. In these figures, like reference numerals in the 200 series are used to refer to like parts. The fishing lure 220 is similar in all respects to the lure 20 except that it has a three-blade spinner 230 having three blades 278, 280, 281 rather than two blades. The blades 278, 280, 281 are equidistantly angularly spaced from each other. As best seen with reference to FIG. 12, each blade 278, 280, 281 includes a main portion 283, 285, 287 extending generally in a respective plane, and a rearward, radially-outward portion 282, 284, 286 bent out of the plane in the same angular direction.

Figure 13:
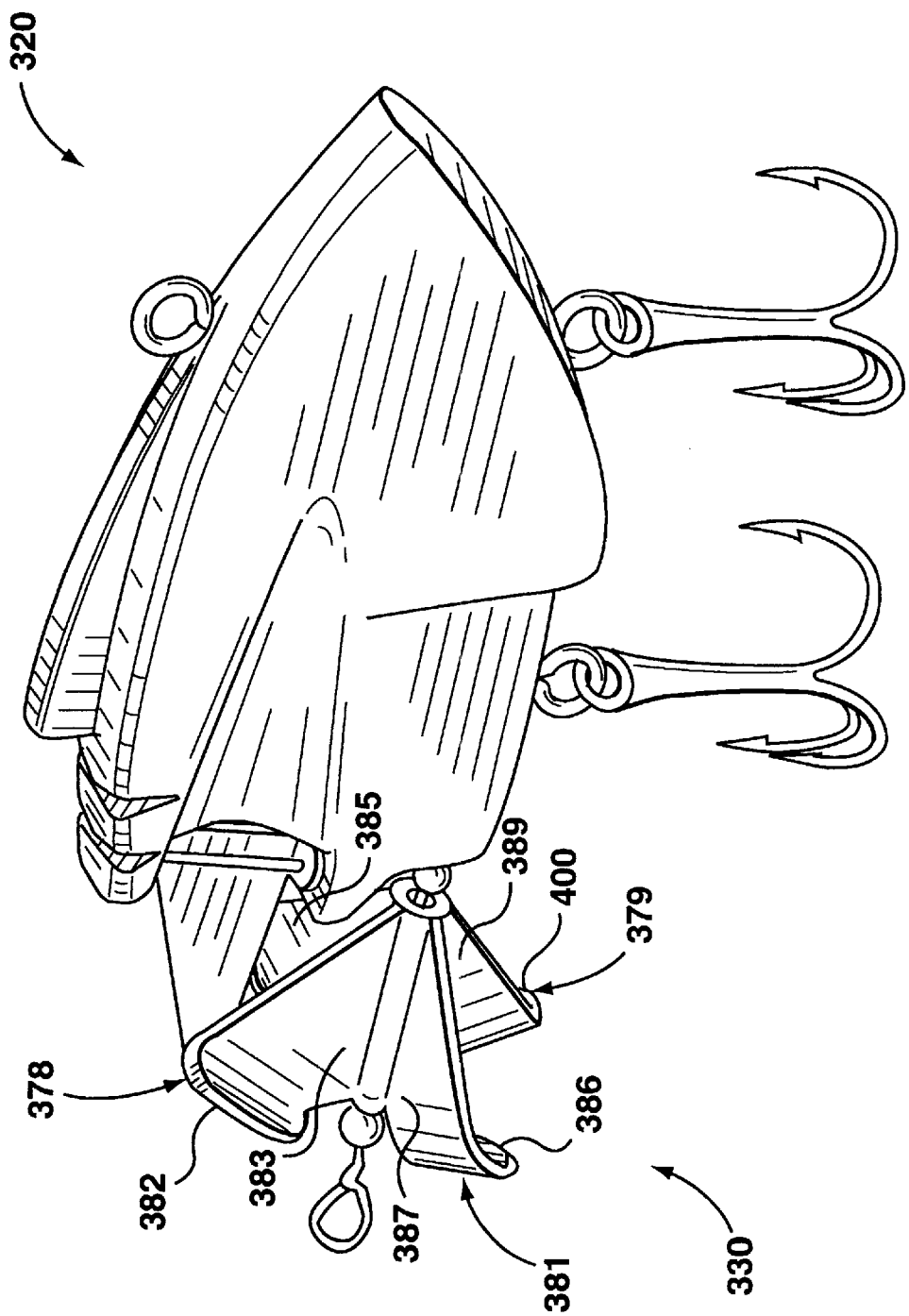
FIG. 13 is a perspective view of a fishing lure according to a third preferred embodiment of the invention having a four blade spinner.

A third preferred embodiment of the invention is shown in FIGS. 13 to 18. In these figures, like reference numerals in the 300 series are used to denote like parts. As in the case of the second preferred embodiment, the fishing lure 320 is similar in all respects to the lure 20 except that it has a four-blade spinner 330 having four radially-extending blades 378, 379, 380, 381, rather than two blades. The blades 378, 379, 380, 381 are equidistantly angularly spaced from each other and, as best seen with reference to FIG. 18, each blade 378, 379, 380, 381 includes a main portion 383, 385, 387, 389 extending generally in a respective plane, and a rearward, radially-outward portion 382, 384, 386, 400 bent out of the plane in the same angular direction.

In the case of all embodiments, when the lures travel under the water, the spinners rotate to create noise as the spinners come in contact with the pivotally retained contact members. The contact members move side to side to resemble the natural motion of a moving tail fin. The motion of the spinners and contact members also create disturbances in the water which can be sensed by and are attractive to fish. Furthermore, since the spinners and contact members are made of metal, they serve to reflect light impinging thereon which can also be detected by fish. All of the above increases the chances of a strike, by target fish.

The lure body of the described embodiments is exemplary of a subsurface lure body. It will be appreciated that other body types and materials used in subsurface lures, as are known in the art, can be substituted for the body type and material of the above-described embodiments without departing from the scope of the invention. For example, it is not strictly necessary to provide a lure body with a tapered nose as shown in the preferred embodiments. The nose may be rounded or blunt.

The embodiments have been described as containing lead pellets. Any suitable metal, such as steel, may be used in the manufacture of the pellets, which are, in any event, optional.

Although not shown, a third hook may be attached to the looped end of the spinner pin to further increase the chances of catching a fish, as is known.

It will be apparent that many obvious modifications may be made to the aforedescribed embodiments without departing from the scope of the invention, as defined by the following claims.

I claim:

1. An audible subsurface fishing lure, for travelling below the surface of a body of water when the lure is retrieved, comprising:

a subsurface lure body having a front, a rear, and a longitudinal axis extending between the front and the rear;

a pair of spaced parallel projections extending rearwardly from said rear, a transversely-extending contact pin having opposing ends secured to respective projections;

a contact member being pivotally retained on said contact pin and extending rearwardly thereof;

a longitudinally-extending spinner pin having a forward end secured to said rear adjacent to one of said projections; and a spinner rotatably mounted on said spinner pin;

wherein said contact member is engageable with the spinner when the spinner is rotating to produce sound for attracting fish.

2. A fishing lure according to claim 1 wherein said spinner comprises a plurality of radially-extending blades equidistantly angularly spaced from each other.

3. A fishing lure according to claim 1 wherein said spinner is tapered forwardly.

4. A fishing lure according to claim 2 wherein each blade includes a main portion extending generally in a respective plane, and a rearward, radially-outward portion bent out of said respective plane.

5. A fishing lure according to claim 4 wherein the spinner has two blades extending generally in one plane and said rearward radially-outward portions of the blades are bent out of said one plane in opposite directions relative to said one plane.

6. A fishing lure according to claim 1 wherein said lure body includes top and bottom surfaces meeting at said front, and spaced opposing side surfaces meeting said top and bottom surfaces.

7. A fishing lure according to claim 1 further comprising at least one hook coupled to said bottom surface for hooking fish.

8. A fishing lure according to claim 6 further comprising a connecting eyelet secured to said top surface of the lure body, for use in connecting the fishing lure to a fishing line.

9. A fishing lure according to claim 4 wherein the spinner has three blades and said rearward, radially-outward portions of the blades are bent out of the respective planes of the blades in the same angular direction.

10. A fishing lure according to claim 4 wherein the spinner has four blades and said rearward, radially-outward portions of the blades are bent out of the respective planes of the blades in the same angular direction.

* * * * *